United States Patent [19]

Lane

[11] Patent Number: 4,893,407
[45] Date of Patent: Jan. 16, 1990

[54] INTEGRAL DUST COVER AND PUMP DRIVE

[75] Inventor: Ronald D. Lane, Lake Oswego, Oreg.

[73] Assignee: Blount, Inc., Portland, Oreg.

[21] Appl. No.: 358,086

[22] Filed: May 30, 1989

[51] Int. Cl.$^4$ .............................................. F16N 13/14
[52] U.S. Cl. ...................................... 30/123.4; 30/383
[58] Field of Search ...................... 30/123.4, 383, 384, 30/385, 386, 387; 83/169

[56] References Cited

U.S. PATENT DOCUMENTS

| | | | |
|---|---|---|---|
| 2,741,276 | 4/1956 | Warren | 30/123.4 |
| 3,044,506 | 7/1962 | Oehrli | 30/123.4 |
| 3,938,622 | 2/1976 | Densow . | |
| 3,970,178 | 7/1976 | Densow . | |
| 3,994,067 | 11/1976 | Hazzard et al. . | |
| 4,353,163 | 10/1982 | Overbury et al. | 30/123.4 |
| 4,644,658 | 2/1987 | Dolata et al. . | |
| 4,683,659 | 8/1987 | Wünsch et al. . | |
| 4,756,396 | 7/1988 | Nagashima et al. . | |
| 4,764,093 | 8/1988 | Nagashima . | |
| 4,819,332 | 4/1989 | Sugihara et al. | 30/383 X |
| 4,847,999 | 7/1989 | Nagashima | 30/383 X |

*Primary Examiner*—Frank T. Yost
*Assistant Examiner*—Willmon Fridie, Jr.
*Attorney, Agent, or Firm*—Robert L. Harrington

[57] ABSTRACT

A chain saw having an outboard mounted centrifugal clutch adapted to drive an automatic lubricating pump. A cavity is formed in the portion of the housing from which the drive shaft protrudes. A worm gear for activating the lubrication pump is mounted in the cavity. A combination seal and worm gear drive member is slidably fit with the adapter of the clutch cup with a worm gear driver portion engaged with the worm gear. A disc shaped seal portion includes a lip that fits into a groove surrounding the cavity, held in place through engagement of the worm gear driver with the worm gear.

4 Claims, 2 Drawing Sheets

INTEGRAL DUST COVER AND PUMP DRIVE

BACKGROUND OF THE INVENTION

1. Field of the Invention

This invention relates to chain saws having automatic lubricating systems wherein the lubrication is pumped to the saw chain and guide bar in reaction to engagement of the clutch for driving the saw chain, and more particularly it relates to a member that combines the functions of generating the drive for the lubricating pump and providing a seal around the pump to protect against dust and dirt contamination.

2. Background Information

On motorized chain saws, an endless saw chain is propelled by a drive sprocket coupled to a centrifugal clutch and is guided and travels in a formed groove in an elongated guide bar. The saw chain is guided and travels in the groove of the guide bar in a sliding metal-to-metal contact. To prevent heat build up, which could damage both the saw chain and guide bar, caused by the sliding metal-to-metal contact and also to reduce friction, a lubricating system is incorporated within the chain saw housing.

The lubricating system has a reservoir that provides a supply of oil to a pump mechanism. When driven, the pump mechanism delivers oil to an aperture in the side wall of the groove of the guide bar via a connecting passageway, thereby providing lubricant to the saw chain and the groove of the guide bar.

The lubricating systems on most chain saws are automatic. That is, oil is supplied to the saw chain and guide bar only when the saw chain is propelled by the engagement of the centrifugal clutch. To provide this automatic feature, the pump drive is therefore also coupled to the centrifugal clutch that propels the saw chain.

In a common embodiment, the lubricating pump drive is coupled to the centrifugal clutch by utilizing a worm gear drive in the form of a threaded hub that is in turn driven by the shaft of the driven clutch cup. (This shaft is commonly referred to as the adapter in that it adapts a particular drive sprocket to the standard chain saw drive.) The worm gear driver is in mesh with a worm gear, and when rotated by the clutch cup, it in turn provides rotation to the worm gear which drives the pump mechanism.

Since chain saws are operated in an environment where wood chips, sawdust and other debris are always present, a seal is provided to protect the pump drive components from these elements. The seal is typically a plastic cylindrical disc that is mounted and rotates with the adapter of the clutch cup. It has a protruding lip on its periphery. A metal washer is sometimes used between the seal and the face of the housing. The face of the housing has a circular groove or recess and the lip of the seal is designed to rotate inside the groove of the housing to cooperatively seal out the debris.

The mounting of the seal in the above-described fashion has some shortcomings. The adapter and the clutch cup to which it is rigidly attached, by design, is permitted some axial float on the drive shaft of the chain saw. The seal being attached to the adapter will float or move away from the housing when the adapter and hub move axially away from the housing face. Movement of the seal away from the housing face provides a space for the entrance of wood chips, dust, etc. into the pump drive mechanism. The seal could also become partially dislodged from its frictional mount and therefore would wobble during rotation and provide an opening for entrance of wood chips, etc.

SUMMARY

Providing an effective seal for the oil pump drive mechanism is necessary due to the operating environment that is present during the operation of chain saws.

The present invention provides an improved retention of the rotary seal that protects the pump drive mechanism from the contaminants of the operating environment. The improvement in seal retention is accomplished by integrating the worm driver and seal into a unit and thereby utilizing the axial force caused by the rotational resistance of the worm gear acting on the helix of the worm driver. The result is improved operation while reducing cost. The single member is believed to be less expensive to produce than the combination of elements of the prior art, and it is easier to assemble into the chain saw.

DESCRIPTION OF THE PREFERRED EMBODIMENT

Figure 1:
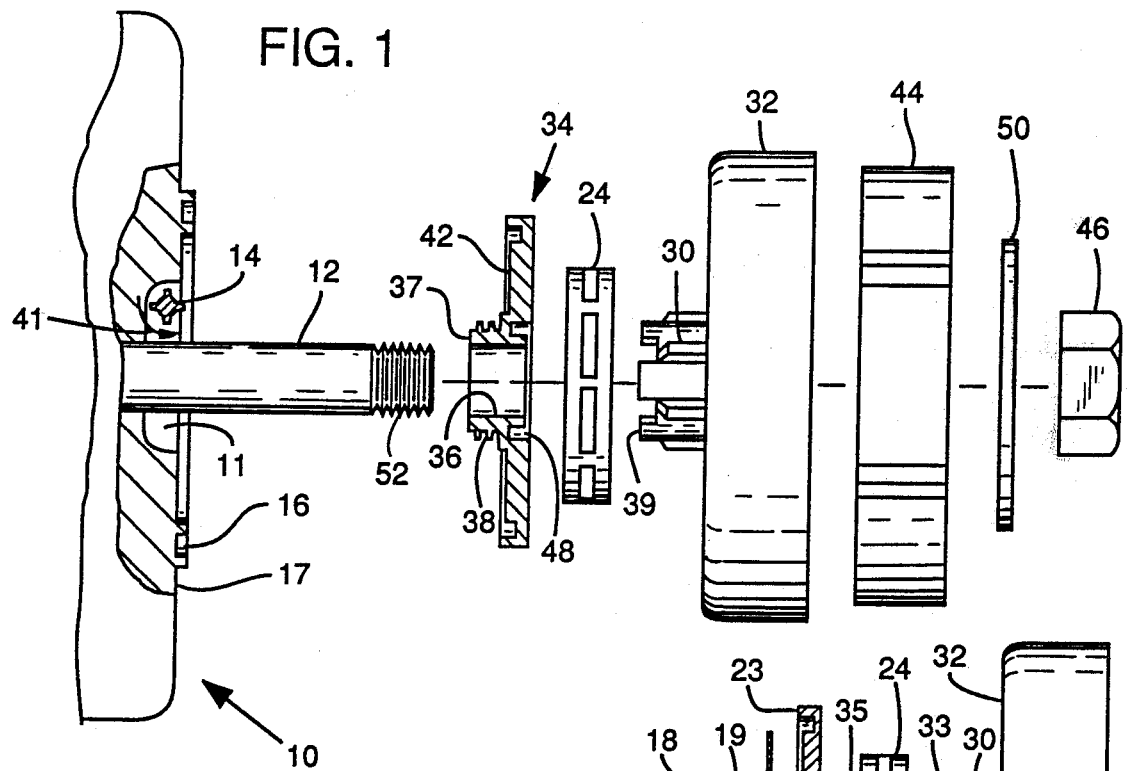
FIG. 1 is an exploded side view of the chain saw components including the clutch mechanism incorporating the present invention.

With reference to the drawings, FIG. 1 is an exploded view of a chain saw housing 10. A cavity 11 in face 17 of the housing has an output or drive shaft 12 protruding outwardly therefrom. Rotatably mounted above and transverse to the output shaft 12, but within cavity 11, is an oil pump worm gear 14. An annular groove 16 that is concentric to the rotational axis of output shaft 12 (and surrounds the cavity 11) is formed in face 17 of the housing 10.

Figure 2:
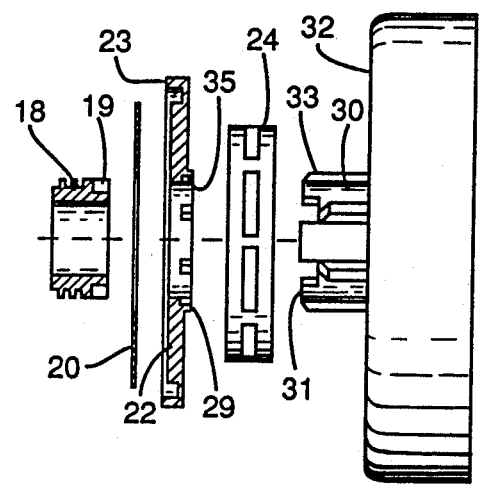
FIG. 2 illustrates the prior art components which are replaced by the device of the present invention.
Figure 3:
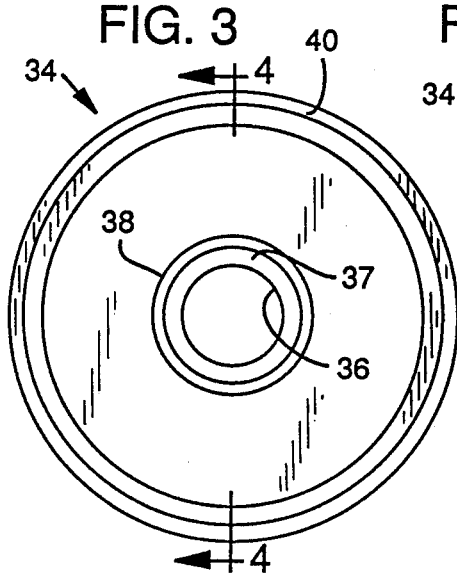
FIG. 3 is a front view of the integral gear driver and seal member of the embodiment of FIG. 1.

The above components of a chain saw are typical of conventional chain saws having outboard clutch mechanism. FIG. 2 illustrates the conventional components utilized in the prior art (shown in exploded view) that interconnect to the drive shaft 12 for driving the saw chain. They include a worm gear driver 18 that fits loosely over shaft 12 and engages worm gear 14 of the housing shown in FIG. 1. A metal washer 20 surrounds the worm gear driver 18 and a plastic seal 22 also surrounds the worm gear driver 18 and metal washer 20 in a manner that permits the annular lip 23 of the seal 22 to ride in the groove 16 of the housing face 17. The adapter 30 of the clutch cup 32 is configured with external splines 33 engaging spline grooves 35 of the rearwardly protruding flange 29 of the seal 22. The seal 22 is thus caused to be rotated with rotation of the clutch cup 32. Lug portions 31 on the end of adapter 30 are configured to project into receiving slot 19 in the worm gear driver 18.

As will be apparent, the worm gear driver 18 is rotatably driven by adapter 30 and seal 22 is also rotatably driven by adapter 30, but the seal 22 and worm gear driver 18 are independent of each other. As previously mentioned, the clutch cup 32 and its adapter 30 are designed to have slight axial movement relative to shaft 12. The worm gear driver 18 is engaged with worm gear 14 (FIG. 1) so that it seeks to pull the worm gear toward the driver (or vice versa) by forcing rotation in a counter-clockwise direction as viewed in FIG. 1 (see arrow 41). Thus, gear driver 18 does not move with the axial movement of the adapter 30. As the adapter 30 is pulled away from the worm gear driver, lug portions 31 can become disengaged from slots 19, particularly as the tip of the lug portion 31 and/or the slots 19 become worn. As concerns seal 22, as the adapter 30 is pulled away from the housing, seal 22 will move away from the groove 16 to expose the cavity 11 and worm gear 14 to the debris generated during the cutting action. Both of these undesired occurrences are cured by the device of the present invention which will now be explained.

An integral combination member 34, which includes a gear driver, seal and washer is illustrated in FIGS. 1, 3, 4, 5 and 7. The configuration of member 34 comprises a cylindrical disc having a hub 37 protruding axially from the inner face 42 of the cylindrical disc. The disc and hub are concentric to a common bore 36, with the bore 36 being sufficiently large to provide a loose fit of member 34 on output shaft 12. (see FIG. 1)

Screw threads 38 are provided on the protruding hub 37 and provide the worm gear driver action of previously described member 18 of FIG. 2. The screw threads 38 mesh with the oblique grooves of the worm gear 14. There is a lip 40 at the periphery of the cylindrical disc of member 34. The lip 40 protrudes beyond the inner face 42 and enters the annular groove 16 of the chain saw housing face 17 when member 34 is mounted on the output shaft 12. The lip 40 is narrower and shallower than annular groove 16, therefore, the lip 40 enters the groove 16, but is not in physical contact with either the side edges or the bottom of the groove 16.

Figure 4:
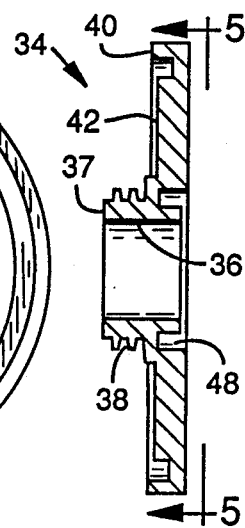
FIG. 4 is a sectional view taken on Lines 4—4 of FIG. 3.
Figure 5:
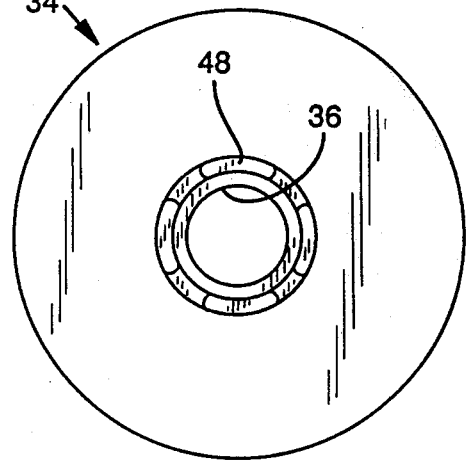
FIG. 5 is a rear view of the integral gear driver and seal member as taken on view line 5—5 of FIG. 4.

Drive slots 48 as shown in FIGS. 4 and 5 are inset into the face of member 34 opposite the protruding hub 37. The drive slots are configured and positioned to be aligned and positively engaged by the protruding drive lugs 39 (FIG. 1) of the clutch cup adapter 30. The drive slots 48 have a sufficient depth to permit the axial float of the driving lugs 39 of the clutch adapter 30, without changing the axial position of the member 34. The driving lugs 39 of the clutch adapter 30 are sufficiently long to provide positive engagement with the drive slots 48 within the limits of the axial float of the clutch adapter 30.

Figure 7:
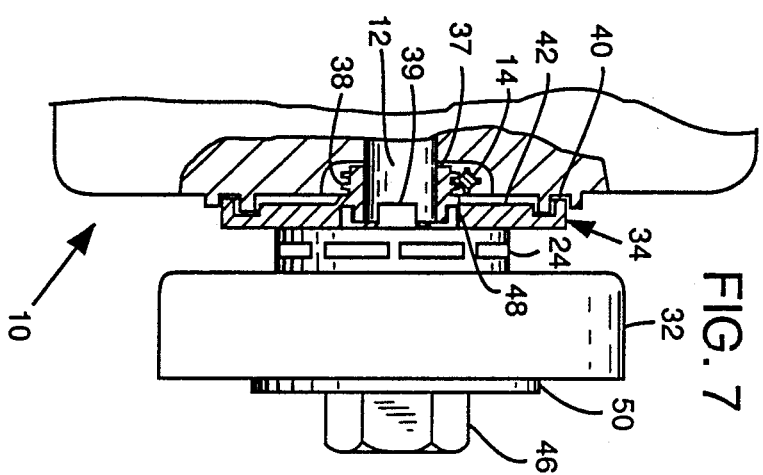
FIG. 7 is similar to FIG. 1 but showing the components assembled.

With particular reference to FIGS. 1 and 7, the member 34 is placed on the output shaft 12, with the threads 38 of the worm gear driver hub 37 engaging and meshed with the worm gear 14. When the worm gear driver (hub 37 and threads 38) meshes with worm gear 14, the lip 40 of member 34 simultaneously enters the annular groove 16 of the housing face 17, and also positions the inner face 42 in close proximity to the chain saw housing face 17.

Figure 6:
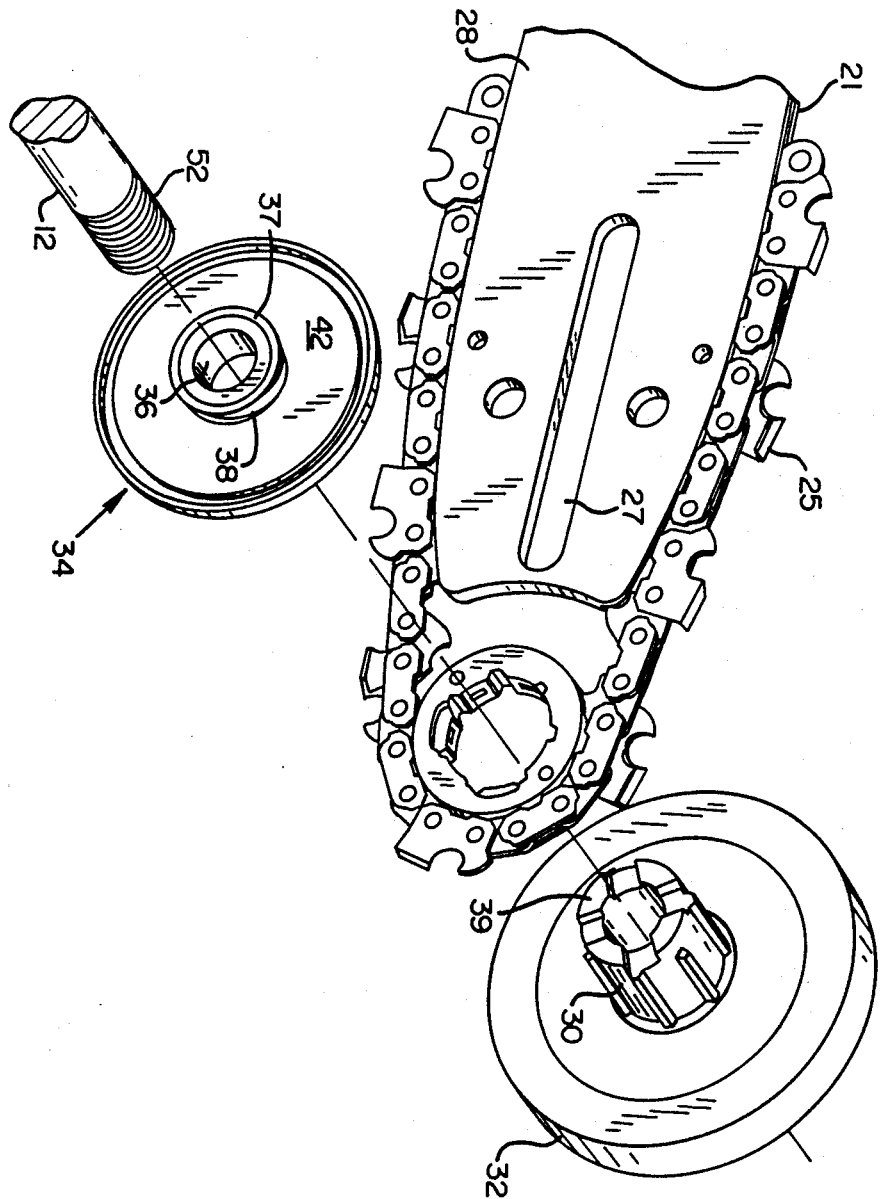
FIG. 6 is an exploded perspective view illustrating the cutting chain and associated components in relation to the clutch mechanism of FIG. 1.

The overall assembly of the chain saw and driver components is shown in the perspective, exploded view of FIG. 6. A guide bar 28 is rigidly fastened to the chain saw housing by bolts protruded through the mounting slot 27. An endless saw chain 25 is positioned in the guide slot 21 on the periphery of the guide bar 28. A rim sprocket 24 is mounted to the adapter 30 of the clutch cup, adjacent one end of the guide bar 28. The clutch cup 32 with adapter 30 is positioned on the output shaft 12, with the rim sprocket 24 fitting in splined engagement on the adapter 30. The protruding drive lugs 39 of the adapter 30 are aligned and enter the drive slots 48 (not shown in FIG. 6) of the member 34. Rigidly attached to the output shaft 12 is a centrifugal clutch (inside the clutch cup 32) which engages and rotatively drives the clutch cup.

When assembled, (see FIGS. 1 and 7) the clutch mechanism 44 located inside cup 32 is retained on shaft 12 by nut 46 (outboard of washer 50) screwed onto the screw threads 52 on the end of shaft 12.

When the output shaft 12 exceeds a predetermined RPM, the centrifugal clutch mechanism 44 frictionally engages the wall of the clutch cup 32 to rotate the clutch cup, adapter, rim sprocket (which drives the saw chain) and the member 34. The rotation of member 34, through screw threads 38 on hub 37, provides rotary motion to the worm gear 14 which drives the oil pump mechanism (not shown). The interengagement of screw threads 38 with worm gear 14 also urges the member 34 axially toward the housing 10, thereby maintaining the sealing interconnection between lip 40 of member 34 and groove 16 of housing 10. The member 34 is retained in position against the housing 10 regardless of the axial float of the clutch cup 32 and adapter 30.

The above embodiment is considered the preferred embodiment of the invention. Others having skill in the art will likely perceive of alternative embodiments, improvements or modifications without departing from the scope of the invention as defined in the following claims.

What is claimed is:

1. A chain saw having a housing and a drive shaft protruding from a cavity in the housing, a pump gear for generating a pumping action for a lubricating pump, said pump gear mounted in the cavity of the housing and adjacent the output shaft, and said housing having an annular groove surrounding the cavity;

a centrifugal clutch mounted on the outboard end of the output shaft, a clutch cup surrounding the centrifugal clutch and a hub adapter having a splined exterior protruding from the clutch cup, said adapter surrounding the output shaft and extending inwardly along the drive shaft toward the housing and said adapter having limited axial movement along said output shaft, a sprocket mounted on the splined exterior of the hub adapter, and the improvement which comprises; a combination member having a disc shaped seal portion integral with a hub shaped gear driver portion, said combination member having a center opening that surrounds the output shaft, and slidable interlock means slidably interlocking the member with the end of the adapter of the clutch cup, and the gear drive portion interengaged with the pump gear located in the cavity of the housing, said gear driver portion driving the pump gear in reaction to the clutch cup being driven by the centrifugal clutch, and an annular lip protruded from the disc-shaped seal portion and protruded into the groove of the housing surrounding the cavity.

2. A chain saw as defined in claim 1 wherein the slidable interlock means includes configured slots formed into the face of the combination member opposite the gear driver portion, and lugs projecting from the end of the hub adapter, said projecting lugs configured to project into the configured slots in the combination member to force rotation of the combination member with rotation of the clutch cup, said lugs and configured slots slidingly interengaged to retain the locking interrelationship while permitting limited relative axial sliding movement between the adapter and combination member.

3. A chain saw as defined in claim 2 wherein the sprocket that rides on the adapter is a rim sprocket, a guide bar projects from a position adjacent the rim sprocket, and a saw chain driven by the sprocket around the guide bar in a manner whereby the saw chain may inadvertently jump off the sprocket to impact the combination member, said combination member made of rigid material to resist deformation by the saw chain in such event.

4. A chain saw as defined in claim 2 wherein the pump gear is a worm gear and the hub shaped gear driver portion has screw threads that engage the worm gear and turning forces exerted thereon due to a screw action urges drawing of the combination member toward the chain saw housing thereby maintaining the lip of the seal portion within the groove of the housing.

* * * * *